C. H. TAYLOR & B. B. NEUTEBOOM.
MAGNETO DRIVING APPARATUS.
APPLICATION FILED JAN. 29, 1917.

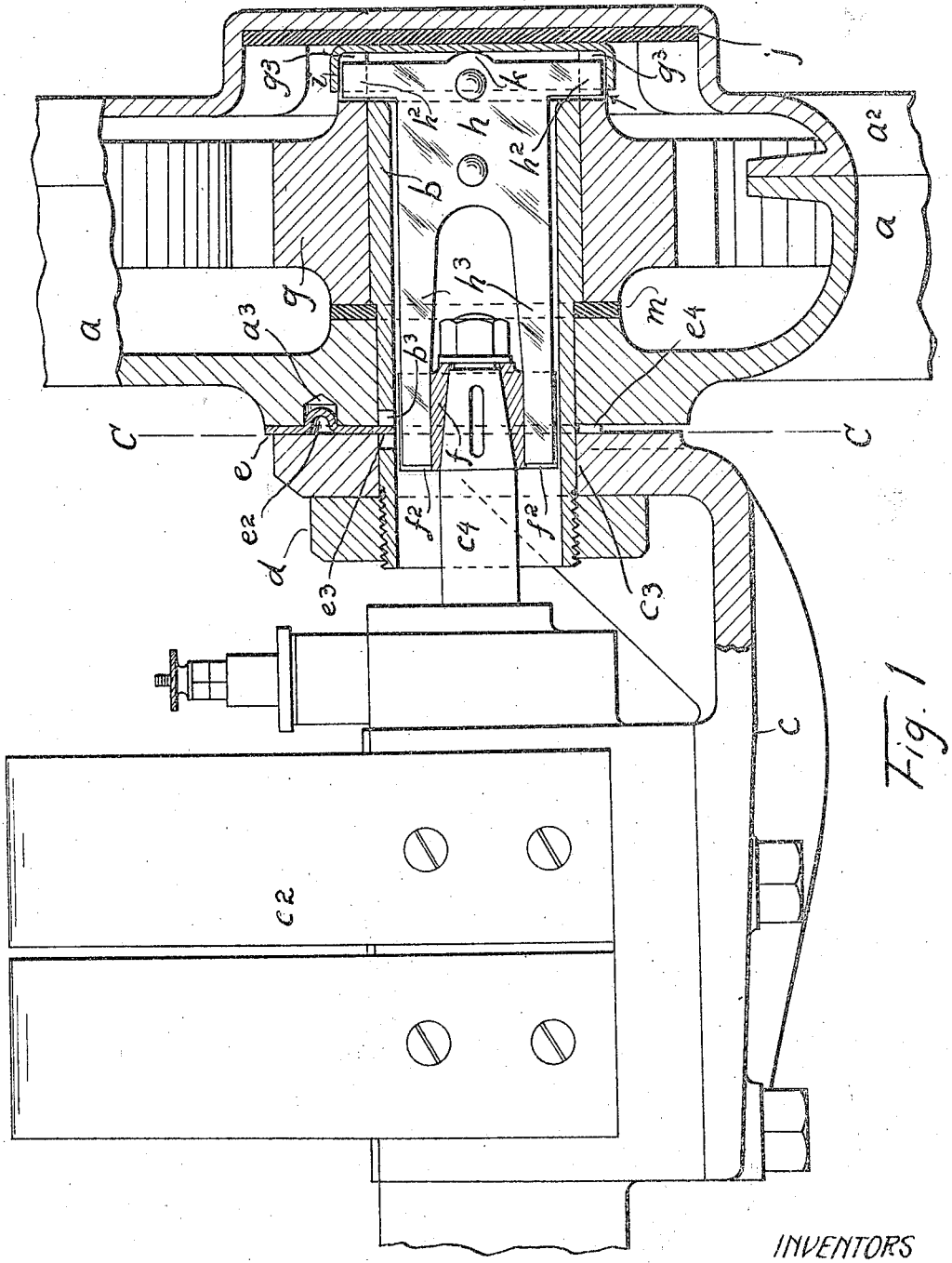

1,262,406.

Patented Apr. 9, 1918.
2 SHEETS—SHEET 2.

INVENTORS
Cecil Hamelin Taylor
Boudewijn B. Neuteboom
BY Ralzemond A. Parker ATTORNEY

UNITED STATES PATENT OFFICE.

ECIL HAMELIN TAYLOR AND BOUDEWIJN B. NEUTEBOOM, OF DETROIT, MICHIGAN.

MAGNETO DRIVING APPARATUS.

1,262,406.  Specification of Letters Patent.  Patented Apr. 9, 1918.

Application filed January 29, 1917. Serial No. 145,246.

*To all whom it may concern:*

Be it known that we, CECIL HAMELIN TAYLOR and BOUDEWIJN B. NEUTEBOOM, citizen of the United States and subject of the Queen of the Netherlands, respectively, residing at Detroit, county of Wayne, State of Michigan, have invented a certain new and useful Improvement in Magneto Driving Apparatus, and declare the following to be a full, clear, and exact description of the same, such as will enable others skilled in the art to which it pertains to make and use the same, reference being had to the accompanying drawings, which form a part of this specification.

Our invention relates to driving apparatus for magnetos for automobile motors and an object of our improvements is to provide an improved apparatus that is readily assembled, easily adjusted, and that affords a yielding transmission for the power.

We secure these objects in the device illustrated in the accompanying drawings in which:

Figure 1 is a side elevation partly in section, on the line A—A Fig. 2, of an apparatus embodying our invention and so much of the adjacent parts of a motor as is necessary to illustrate its connection therewith.

Figure 4:
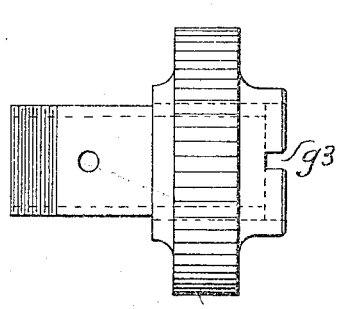
Fig. 4 is a detail view of the tubular arbor and the driving pinion mounted thereon.
Figure 2:
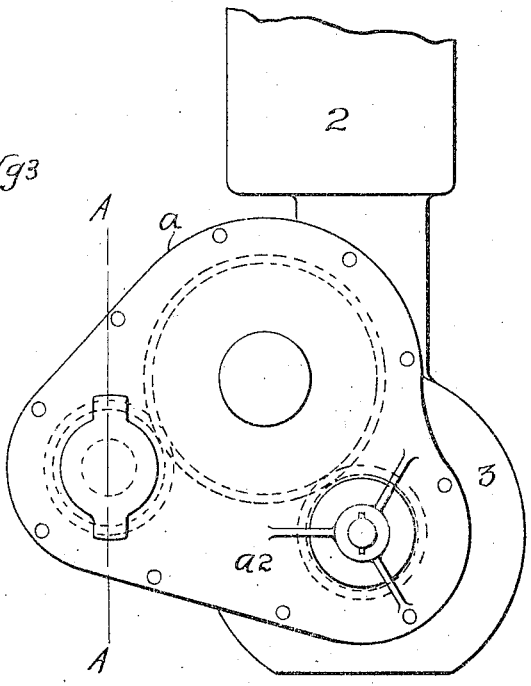
Fig. 2 is a partial end elevation.

In Fig. 2, 2 indicates the cylinder and 3 the crank case of an engine.

$a$ is a gear casing. Into the inner wall of this casing is rigidly fixed a tube $b$ which extends through the wall and has its inner end threaded.

Figure 3:
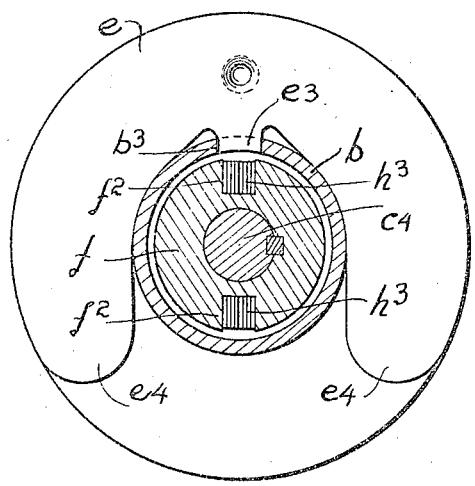
Fig. 3 is a detail view partly in section on the line C—C Fig. 1.

To prevent possible angular displacement of the tube $b$ it is provided with a sheet metal washer or locking piece $e$ shown most completely in Fig. 3. This sheet metal piece has a lug formed on it by indenting the metal, as shown at $e^2$ and this lug fits into a drill-hole $a^3$ in the inner face of the inner wall of the casing $a$. The washer $e$ has two branches $e^4$ $e^4$ which extend and fit over the tube $b$ and it also has a lug $e^3$ formed at the junction of the two branches $e^4$ $e^4$ which lug extends downward and engages in an aperture $b^3$ through the wall of the tube $b$.

$c$ is the shelf of a bracket upon which is secured the magneto $c^2$. This shelf extends in a securing bracket which is sleeved at $c^3$ around the tube $b$, its inner face engaging against the washer or locking plate $e$. $d$ is a nut, its threads engaging the threads upon the inner end of the tube $b$ and serving to fix the bracket $c$ $c^3$ in position. By loosening the nut $d$ the bracket may be adjusted to any angular position desired and by tightening up the nut the bracket is firmly secured in place.

$g$ is a small gear wheel sleeved and adapted to turn upon the outer end of the tube $b$ as an arbor. $m$ is a washer interposed between the inner wall of the gear casing $a$ and the inner end of the hub of the gear wheel $g$. Said hub extends at its other end beyond the end of the tube $b$ and is provided with oppositely located slots $g^3$ $g^3$ extending radially through its wall beyond the end of the tube $b$.

$c^4$ is a shaft of the magneto and this is provided with a driving sleeve $f$ fixed at its end. The sleeve $f$ is provided with oppositely located radially extending slots $f^2$ $f^2$. The shaft $c^4$ is concentric with the tube $b$ and extends into said tube.

Figure 5:
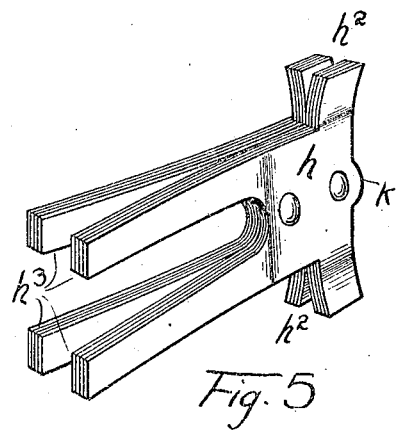
Fig. 5 is a perspective of the connecting and driving member.

$h$ is the transmission member. This is made up of a number of pieces of elastic sheet-metal laid face to face and riveted together, as shown most distinctly in Fig. 5. It has at one end two oppositely located laterally extending arms $h^2$ $h^2$, the constituent plates of these arms diverge somewhat toward their outer ends. The member $h$ is forked at its other end providing the two limbs $h^3$ $h^3$, the plates in each of which also diverge toward the ends as shown in Fig. 5. The transmission member $h$ is placed within the tube $b$, its arms $h^2$ $h^2$ engaging elastically in the slots $g^3$ $g^3$ and its limbs $h^3$ $h^3$ extending and engaging elastically in the slots $f^2$ $f^2$ in the sleeve $f$ upon the shaft of the magneto. At the center of the outer end of the member $h$ there is formed the arched portion $k$. $i$ is a cap which fits over the hub of the wheel $g$ and engages against the part $k$ on the member $h$ to hold the same in position. $a^2$ is the cover of the gear case and $j$ is a thrust washer interposed between the cap $i$ and the wall of said cover. It will be noticed that the transmission member $h$ is readily inserted in place and provides a slightly elastic connection for the transmission of the power and that the portion $k$ permits the member $h$ to adjust itself to place without cramping and to accommodate a small variation in the alinement of the axes of the shaft $c^4$ and the pinion $g$.

The flange of the cap $i$ does not quite cover the slots $g^3$ so as to leave a small space as indicated by the arrow through which oil will be discharged by centrifugal force so that it shall not tend to accumulate and run back upon the magneto.

It will be understood that when we speak of the shaft $c^4$ and pinion $g$ being coaxial that this expression is only approximate as provision is made for a slight variation that may arise in practice. It will also be understood that while we have described this driving apparatus as applied to driving a magneto that other similar devices may be actuated by it, such as a timer or the like.

What we claim is:

1. In an apparatus of the kind described, a revoluble driving member having an aperture through its center, a rotatable driven member axially in line with said driving member, said driving member being provided with a radial slot in its wall at its end, said driven member being provided with a slot at its end, a transmission member having a laterally extending arm at one end engaging in the slot of the driving member, said transmission member extending into the aperture in said driving member and at its other end engaging in the slot of the driven member.

2. In an apparatus of the kind described, the combination of a tubular arbor, a driving member mounted and adapted to turn on said arbor, a driven member coaxial with said arbor, a slot in said driving member in one plane transverse to the axis of said arbor, a slot in the driven member in another plane transverse to the axis of said member, said slots opening in the same direction, and a transmission member having a lug adapted to engage the slot in said driving member, and a lug adapted to engage in the slot in said driven member, said transmission member so engaging said driving member at one end and extending into said arbor and so engaging the driven member at the other end.

3. In an apparatus of the kind described, a tubular arbor, a driving member mounted and adapted to turn on said arbor, a bracket sleeved upon said arbor and angularly adjustable thereon, a magneto mounted upon said bracket and having its shaft coaxial with said arbor, a transmission member engaging said driving member extending into said arbor and engaging said shaft.

4. In an apparatus of the kind described, a tubular arbor, a driving member mounted and adapted to turn on said arbor, a bracket sleeved upon said arbor and angularly adjustable thereon, a magneto mounted upon said bracket and having its shaft coaxial with said arbor, a transmission member engaging said driving member extending into said arbor and engaging said shaft, and means for securing said bracket in its adjusted position.

5. The combination of an arbor, a wall in which said arbor engages, said arbor being provided with an aperture in its periphery adjacent to one face of said wall, said wall being provided with an aperture in its face, a locking member engaging said arbor and having a lug extending into the aperture in the periphery thereof and a lug extending into the aperture in the face of said wall.

6. The combination of an arbor, a wall in which said arbor engages, said arbor being provided with an aperture in its periphery adjacent to one face of said wall, said wall being provided with an aperture in its face, a sheet metal locking member engaging said arbor and having a lug engaging the peripheral opening therein, said locking member and said plate being bent outward to form a lug engaging in the aperture in the face of said wall.

7. In an apparatus of the kind described, a revoluble driving member having an aperture through its center, a rotatable driven member axially in line with said driving member, a transmission member removably engaging said driving member extending into said aperture and removably engaging said driven member, and a cap secured upon the end of said driving member and acting to retain said transmission member in its engaged position.

8. In an apparatus of the kind described, a revoluble driving member having an aperture through its center, a rotatable driven member axially in line with said driving member, a transmission member removably engaging said driving member extending into said aperture and removably engaging said driven member, and a cap secured upon the end of said driving member and acting to retain said transmission member in its engaged position, said transmission member being provided with an arched portion $k$ at the center of its outer end engaging the inner surface of said cap.

9. In an apparatus of the kind described, the combination of a tubular arbor, a driving member mounted and adapted to turn on said arbor and having one end extending beyond the adjacent end of said arbor, a driven member coaxial with said arbor, a transmission member engaging said driving member at one end and extending into said arbor and engaging the driven member at the other end, said driving member being provided with a radially extending aperture through the portion of its wall extending beyond said arbor.

In testimony whereof, we sign this specification.

CECIL HAMELIN TAYLOR.
BOUDEWIJN B. NEUTEBOOM.